(12) United States Patent
Kroger et al.

(10) Patent No.: US 10,316,446 B1
(45) Date of Patent: Jun. 11, 2019

(54) SEWING MACHINE FOR CONTINUOUS STRENGTH MEMBERS

(71) Applicants: Michael J. Kroger, Middletown, RI (US); Brian K. Amaral, Newport, RI (US); Robert F. Cutler, III, Tiverton, RI (US); Michael R. Williams, Richmond, RI (US); Charles A. Holicker, Swansea, RI (US); Eric A. Lee, Warwick, RI (US); Jason R. Bernier, Exeter, RI (US); Kathryn A. Best, Warwick, RI (US)

(72) Inventors: Michael J. Kroger, Middletown, RI (US); Brian K. Amaral, Newport, RI (US); Robert F. Cutler, III, Tiverton, RI (US); Michael R. Williams, Richmond, RI (US); Charles A. Holicker, Swansea, RI (US); Eric A. Lee, Warwick, RI (US); Jason R. Bernier, Exeter, RI (US); Kathryn A. Best, Warwick, RI (US)

(73) Assignee: The United States of America as represented by the Secretary of the Navy

( * ) Notice: Subject to any disclaimer, the term of this patent is extended or adjusted under 35 U.S.C. 154(b) by 85 days.

(21) Appl. No.: 15/715,197

(22) Filed: Sep. 26, 2017

Related U.S. Application Data

(60) Provisional application No. 62/424,669, filed on Nov. 21, 2016.

(51) Int. Cl.
*D05B 55/10* (2006.01)
*D05B 29/12* (2006.01)
(Continued)

(52) U.S. Cl.
CPC ........... *D05B 55/10* (2013.01); *D05B 21/002* (2013.01); *D05B 29/12* (2013.01); *D05B 35/08* (2013.01);
(Continued)

(58) Field of Classification Search
CPC ........ D05B 55/00; D05B 55/10; D05B 73/12; D05B 13/00; D05B 13/02; D05B 21/00;
(Continued)

(56) References Cited

U.S. PATENT DOCUMENTS 2,711,142 A * 6/1955 Matthies ................... D05B 3/24
112/147
2,915,027 A * 12/1959 Smith ...................... B68G 7/10
112/139
(Continued)

*Primary Examiner* — Ismael Izaguirre
(74) *Attorney, Agent, or Firm* — James M. Kasischke; Michael P. Stanley

(57) ABSTRACT

A strength member sewing machine is provided which comprises upper and lower feeder spools, a collection spool and idlers positioned on a support structure. A cord supply, a fabric shaper, a speed control and a pressure foot lift are positioned on the structure. Fabric from the spools is kept in tension with the idlers while moving toward the fabric shaper. The fabric from the upper spool is crimped while the fabric from the lower spool remains flat underneath the shaper. Between the fabric layers, pull cords are pulled through from the cord supply thru the fabric shaper. The fabric with crimps and with the pull cords inside the crimps is sewn to the fabric from the lower spool to create casings with a pull cord in the internal space of each casing. The joined fabrics with the pull cords are collected by the collection spool as a finished product.

18 Claims, 12 Drawing Sheets

(51) Int. Cl.
  *D05B 35/08* (2006.01)
  *D05B 69/04* (2006.01)
  *D05B 73/12* (2006.01)
  *D05B 21/00* (2006.01)
  *D07B 1/14* (2006.01)
  *D07B 5/00* (2006.01)
  *G01V 1/20* (2006.01)

(52) U.S. Cl.
  CPC ............. *D05B 69/04* (2013.01); *D05B 73/12* (2013.01); *D07B 1/147* (2013.01); *D07B 5/005* (2013.01); *G01V 1/201* (2013.01); *D07B 2301/4091* (2013.01)

(58) Field of Classification Search
  CPC ...... D05B 21/002; D05B 29/08; D05B 29/12; D05B 35/00; D05B 35/06; D05B 35/08; D05B 35/085; D05B 35/10; D05B 69/04; D05B 3/12; D05B 23/004; D05B 23/006; D05B 27/00; D05B 33/00; D05B 44/00; D05B 53/00; D07B 1/14; D07B 1/147; D07B 5/005; D07B 2301/4091; G01V 1/201; G01V 1/204; G01V 1/208
  See application file for complete search history.

(56) References Cited

U.S. PATENT DOCUMENTS

| | | | | |
|---|---|---|---|---|
| 3,150,621 | A * | 9/1964 | Warnock | D05B 35/062 112/139 |
| 3,285,546 | A * | 11/1966 | Jalbert | B64C 31/036 244/145 |
| 4,017,579 | A * | 4/1977 | Roe | B29C 47/027 174/103 |
| 4,538,250 | A * | 8/1985 | De Metz | G01V 1/201 367/130 |
| 4,636,998 | A * | 1/1987 | Greene | G01V 1/201 174/351 |
| 5,400,729 | A * | 3/1995 | Bryant | D05B 35/06 112/139 |
| 6,398,190 | B1 * | 6/2002 | Li | G02B 6/4459 254/134.3 FT |
| 6,571,833 | B1 * | 6/2003 | McLarty, III | G02B 6/4459 112/155 |
| 9,212,520 | B1 * | 12/2015 | Hennings | B64D 17/02 |
| 2004/0264893 | A1 * | 12/2004 | Cooke | G02B 6/2558 385/99 |
| 2009/0107720 | A1 * | 4/2009 | Berland | G01V 1/201 174/74 A |

* cited by examiner

SEWING MACHINE FOR CONTINUOUS STRENGTH MEMBERS

This patent application claims the priority of U.S. Provisional Patent Application Ser. No. 62/424,669 filed on Nov. 21, 2016 by the inventors Michael Kroger, Brian Amaral, Eric Lee, Robert Cutler, Michael Williams, Jason Bernier, Charles Holicker and Kathryn Best.

STATEMENT OF GOVERNMENT INTEREST

The invention described herein may be manufactured and used by or for the Government of the United States of America for governmental purposes without the payment of any royalties thereon or therefor.

CROSS REFERENCE TO OTHER PATENT APPLICATIONS

None.

BACKGROUND OF THE INVENTION

(1) Field of the Invention

The present invention is an assembly that automates the manufacture of an internal strength member of a towed array. The assembly attaches pieces of fabric using a multi-needle sewing machine to sew multiple linear pockets in a section of the fabric in which cords are used to pull the strength members into the pockets.

(2) Description of the Prior Art

Towed arrays require an internal strength member to support the tension experienced while the towed array is deployed. Typically and especially for prototype arrays, strength members have been handmade. Handmade strength members generally require an exorbitant amount of labor to produce.

Production towed arrays use a manufactured sock where strength members are stitched on top of a nylon and fabric base. Electrical wires are also stitched into the production sock. However, a production sock is not desirable for research and development purposes because the production sock is too complex and expensive to use for prototype arrays built for these purposes.

A typical internal strength member is comprised of a fabric housing also known as a sock with individual high strength ropes known as strength members. The sock keeps the strength members from becoming entangled with each other as well as becoming entangled with the electronics inside the towed array. The positioning of the strength members is achieved by the sock having individual, open-ended, tubular, linear pockets for each strength member to pass through for the length of the array. The process of hand making socks involved manually sewing each pocket down the length of the sock. Typical socks have more than a dozen pockets and are over one hundred feet long.

Each stitch line for each pocket is manually sewn with a sewing machine; however, maintaining exact dimensions between each stitch line is difficult as each stitch line is sewn down the length of the sock before an adjacent stitch line is sewn. Typically, stitch lines are not perfectly straight when sewn, so the resulting pockets are not straight and the internal space of each pocket varies. After the pockets are sewn, pull cords are manually fed through each pocket.

The strength members are pulled into the pockets using the pull cords. When the internal space of a pocket is too small, it is difficult and sometimes impossible, to pull the strength members through the pocket. If the internal space of a pocket is too small to pull a strength member through, then the portion of the pocket that is too small has to be cut out and re-stitched. Rework of non-straight stitch lines increases the risk of the sock failing from the fabric ripping or the stitch line being interrupted, breaking, or becoming untied.

As a result of the known labor intensive and complex methods of manufacturing towed array internal strength members, a need exists for an automated and efficient assembly for the manufacture of the strength members.

SUMMARY OF THE INVENTION

Accordingly, it is a general purpose and primary object of the present invention to provide an assembly for manufacturing an internal strength member of a towed array.

It is a further object of the present invention to automate the manufacture of an internal strength member of a towed array.

It is a still further object is provide an assembly of modular components for the manufacture of various types of internal strength members.

It is a still further object is provide an assembly for quick loading and unloading of material and components for easy and rapid manufacture of an internal strength member.

In order to obtain the objects described, an internal strength member sewing machine is provided in which the sewing machine comprises upper and lower feeder spools, a collection spool, and idlers—with all of the components positioned on a support structure. A cord supply, a fabric shaper, a speed control and a pressure foot lift are also provided and positioned on the support structure.

In operation, fabric from the upper spool and the lower spool is fed to be in contact with the idlers. The idlers maintain tension in the fabric moving toward the fabric shaper.

The fabric from the upper spool is crimped in the fabric shaper while the fabric from the lower spool remains flat and passes underneath the fabric shaper. Between the layers of fabric, pull cords are pulled through and guided from the cord supply thru the fabric shaper.

The fabric with crimps from the upper spool and with the pull cords inside the crimps is stitched to the fabric from the lower spool at the troughs of the crimps; thereby creating linear casings with a pull cord in the internal space of each casing. The joined fabrics with the pull cords in the casings are collected by the collection spool as a finished product.

The fabric in the feeder spools is configured to be easily change out or be replaced. A clamp top is attached to the clamp base of each feeder spool by a hinge. When the clamp top is closed, a quick-release pin locks the clamp top with the spool and fabric inserted to the clamp base. A clamp knob is rotated to increase or decrease the tension placed on the spool by the clamp top and the clamp base. A bearing reduces the wear on a spool shaft of the feeder spools; prevents wear of the clamp base; and allows for the smoother rotation of the spools.

An alignment tool is located between one of the flanges attached to the spool and the clamp base. The position of the alignment tool is adjustable so that the tool is placed in contact with one of the flanges. When the alignment tool is in contact with the flange, the tool puts pressure on the flange to align the feeder spool so that the fabric leaves the feeder spool as flat and straight. The idlers maintain tension and dampen sudden jolts in the fabric to make the feed of fabric to the sewing machine more constant with less disruption.

The cord supply distributes pull cords in a controlled fashion to prevent the entanglement of the pull cords before the cords enter into the sewing machine. Each supply spool of the pull cords can be replaced individually with the tension on the pull cords being varied by applying weights on top of the spools.

The fabric shaper shapes the fabric from the upper spool into the crimps that are stitched into the casings for the longitudinal pull cords. Grooves in the fabric shaper guide the pull cords from the cord guide to the sewing machine. The sections of the fabric shaper can be easily changed to alter the pattern of what is fed to the sewing machine.

A lower section of the fabric shaper guides the fabric from the lower spool, which remains flat and unshaped, into the sewing machine. Magnets in the lower section attract to the metallic deck of the sewing machine to reduce the vibration of the deck and the fabric shaping while the sewing machine is running. This reduces independent movement of the deck and fabric shaping. A guide rail attached to each side of the underside of the upper section base attaches to the support structure and allows a distance between the fabric shaper and the sewing machine to be adjusted.

The fabric from the upper spool that becomes crimped meets the pull cords and the flat fabric from the lower spool at the end of the fabric shaping. As the crimped fabric leaves the fabric shaping, the pull cords enter the crimps. The flat fabric from the lower spool slides along the deck of the sewing machine and is underneath the crimped fabric and the pull cords before entering the sewing machine. The sewing machine includes the deck and a thread stand with the stand supplying the thread used by the sewing machine to stitch the casings.

The collection spool collects a finished product of fabric as the product leaves the sewing machine. The collection spool may be adjusted to evenly collect the finished product. A speed control is used to regulate and maintain the speed of the sewing machine. The speed control can also be used to move the location from which the user operates the clutch to the side of the sewing machine.

BRIEF DESCRIPTION OF THE DRAWINGS

Other objects, features and advantages of the present invention will be better understood by means of a detailed description of the drawings that illustrate the principals of the present invention in which.

DETAILED DESCRIPTION OF THE INVENTION

Figure 1:
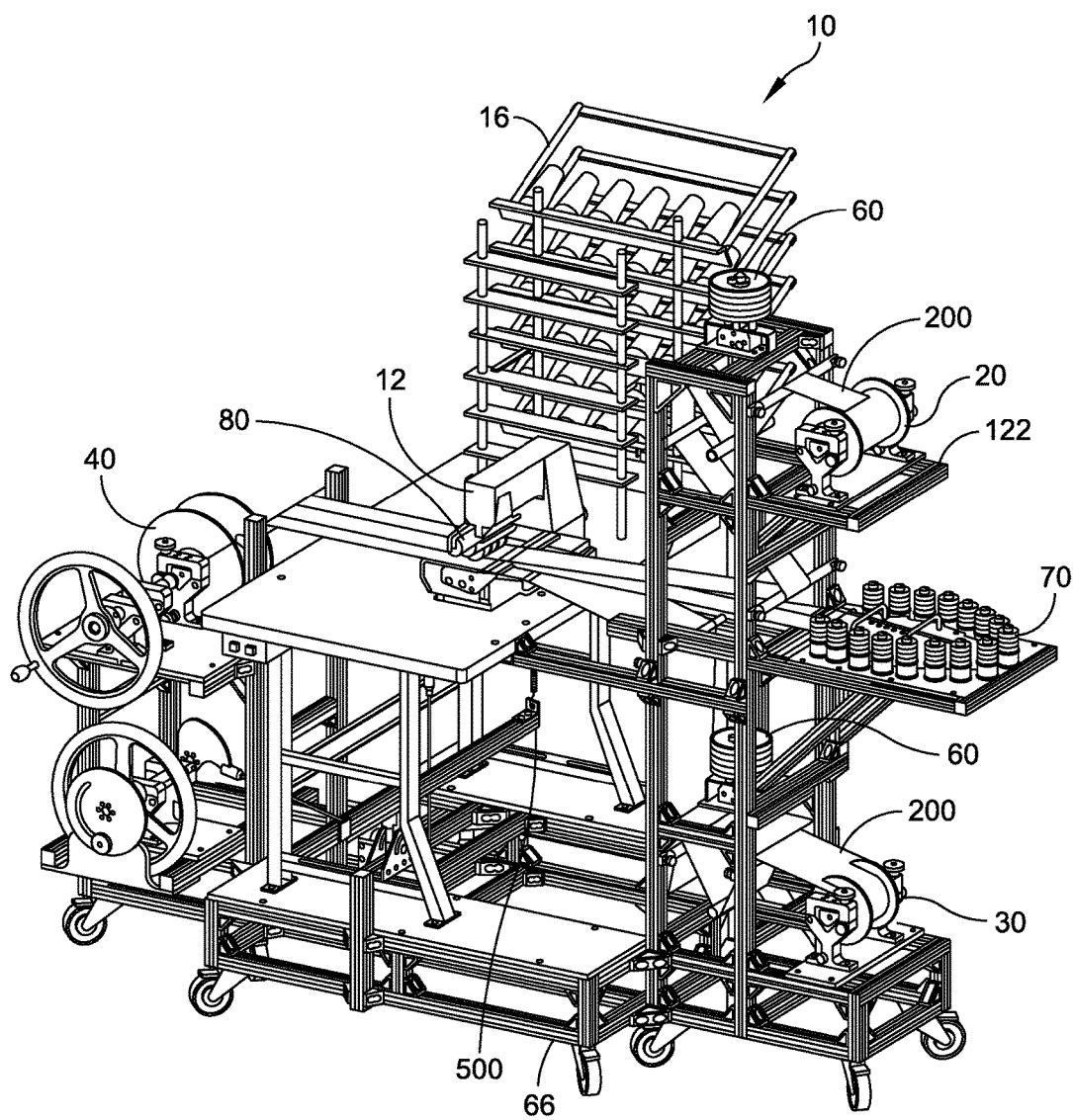
FIG. 1 depicts a multi-needle sewing machine and fabric shaper of the present invention with the sewing machine having upper and lower spools, idlers, a cord supply, a multi-needle sewing machine, a collection spool, a speed control and a pressure foot lift, all attached to a support structure.

An internal strength member sewing assembly 10 of the present invention is shown in FIG. 1. The sewing machine assembly 10 generally comprises a multi-needle sewing machine 12, an upper spool 20, a lower spool 30, a collection spool 40, idlers 60, a support structure 66, a cord supply 70 and a fabric shaper 80. A speed control and a pressure foot lift 500 for the sewing machine assembly 10 is also depicted in the figure.

Generally, in operation, fabric 200 from the upper spool 20 and the lower spool 30 is fed to be in contact with the idlers 60. The idlers 60 maintain tension in the fabric 200 as the fabric moves toward the fabric shaper 80. The fabric 200 from the upper spool 20 is crimped in the fabric shaper 80, while the fabric from the lower spool 30 remains flat and passes underneath the fabric shaper.

Figure 2:
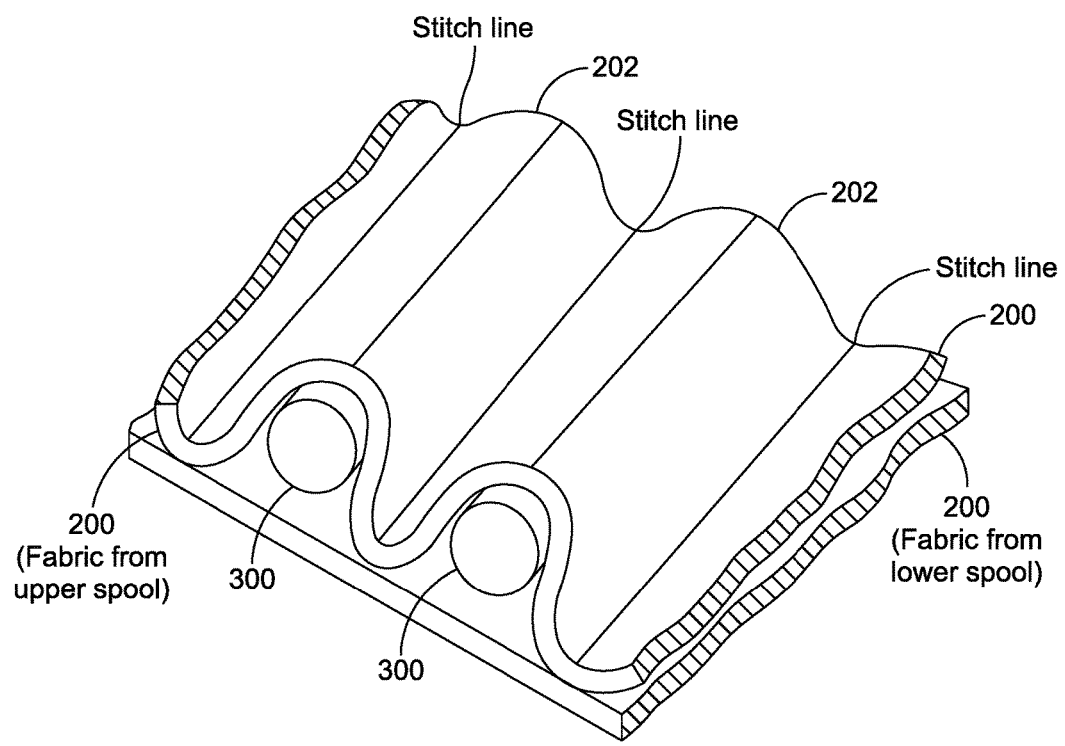
FIG. 2 is a sectional view of a completed sock with adjacent casings, pull cords inside the casings and stitching connecting upper and lower sections of fabric.

As shown in conjunction with FIG. 2, between the layers of fabric 200, a plurality of pull cords 300 are pulled through and guided from the cord supply 70 thru the fabric shaper 80. The fabric 200 with crimps from the upper spool 20 and with the pull cords 300 inside the crimps is stitched to the fabric from the lower spool 30 at the troughs of the crimps, thus creating individual, linear casings 202 with a pull cord 300 in the internal space of each casing. The joined fabrics with the pull cords 300 in the casings 202 are collected by the collection spool 40 as a finished product 400 for future use.

The sewing assembly 10 can be automated with sensors and other devices, such as motors, sensors, or solenoids, for autonomous or automatic sock production. The sewing assembly 10 could be supplied with material and set up for production, set to run within certain parameters by the user using a computer interface, and left to run by the user until sock production is complete or a problem is detected that requires user attention.

Sensors can be placed at the upper spool 20, the lower spool 30, and the cord supply 70 to detect when the supply of fabric 200 or pull cord 300 is depleted or nearing depletion. These sensors could also detect if the fabric 200 and pull cords 300 remain properly aligned and untangled. If the sensors in the upper spool 20 and the lower spool 30 detect that the fabric 200 being fed to the fabric shaper 80 is not properly leaving the spool then a motor can actuate an alignment tool to adjust the position of the spool and maintain the straightness of the fabric leaving the spool.

A similar system of sensors and motors could be used to maintain the straightness of finished product to the collection spool 40 or the alignment of the collection spool itself. Sensors could detect when collection at the collection spool 40 is complete. Additionally, the collection spool 40 could have a motor so that a user does not need to hand crank the spool to collect the finished product 400. With the collection spool 40 driven by its own motor, a sensor could match the speed of the motor driving the sewing machine 12 to the speed of collection by the collection spool for an efficient production of socks.

Furthermore, a sensor could detect if the input of the sewing machine 12 is in contact with the fabric 200 entering the sewing machine. Contact between the input and the fabric 200 could be desirable or undesirable, depending on the type of sock produced, and could be set by the user. Also, sensors could be placed in the fabric shaper 80 to detect whether the fabric 200 is being crimped properly and whether the sections of the fabric shaper are properly attached. Additional sensors could be placed on a guide rail 92 of the fabric shaper 80 and a motor could be used to change the position of the fabric shaper relative to the sewing machine 12. Sensors placed on the underside of the fabric shaper 80 could detect if the pull cords 300 have become entangled or are out of position as the pull cords enter the sewing machine 12.

As shown in various areas of FIG. 0.1, the support structure 66 of the sewing machine assembly 10 is adjustable by the use of slotted extrusions or other mechanically modifiable attachment points with the material of the support structure preferably being aluminum. However, the material and adjustment mechanism of the support structure 12 is not limited to the material and structural limitations described herein.

Figure 3:
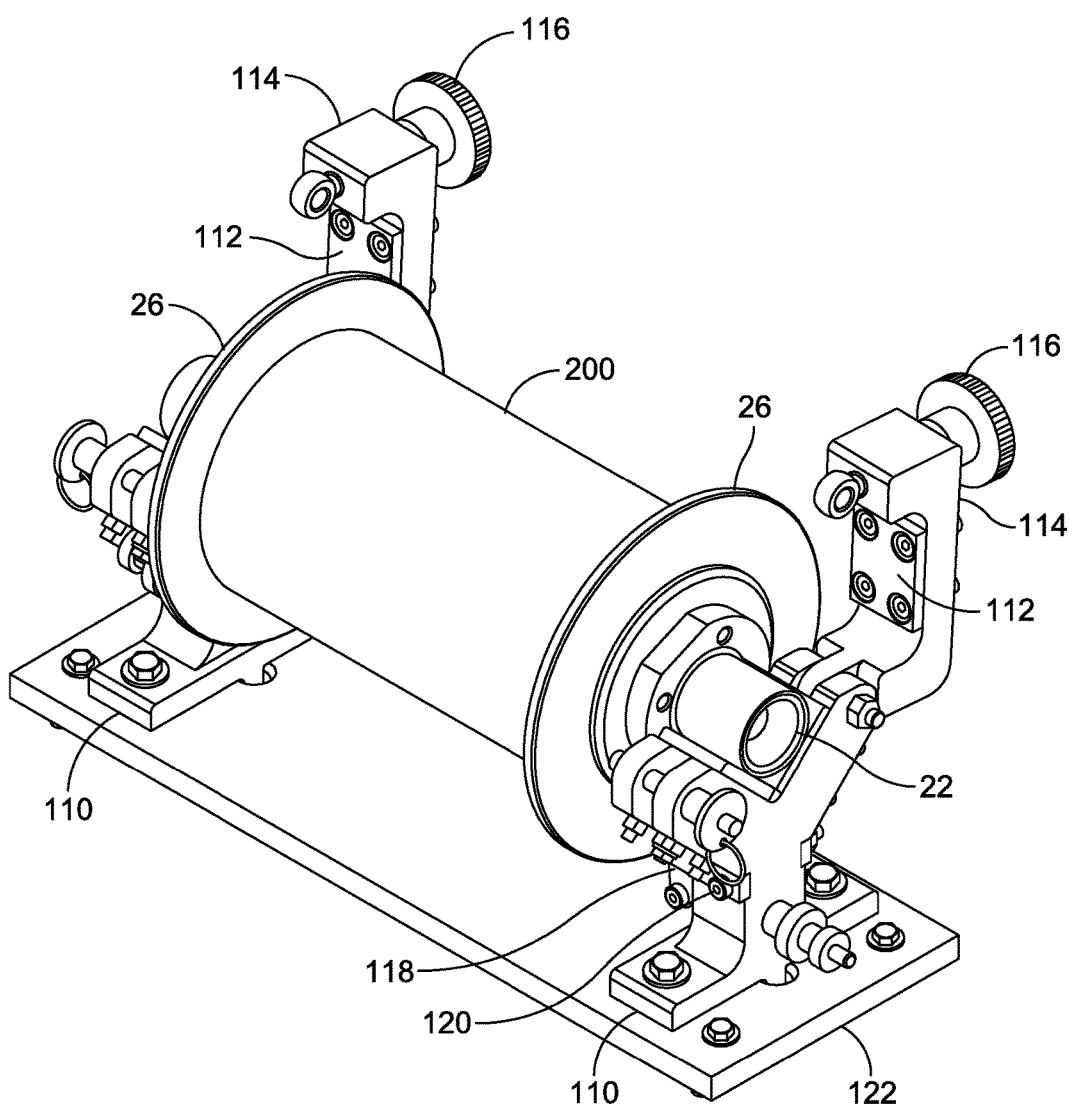
FIG. 3 depicts the upper spool with a clamp top shown hinged open to allow placement of a fabric spool.

The upper spool 20 and the lower spool 30 contain fabric or material that is being joined together. The upper spool 20 is wider than the lower spool 30 as the fabric 200 is shaped into the casings 202 before being stitched. This shaping action requires more fabric 200. A detailed view of the upper spool 20 is shown in FIG. 3. The lower spool 30 is identical in mechanical configuration and basic operation. Also, the fabric 200 on the lower spool 30 remains flat as the fabric proceeds through the sewing machine 10. In order to maintain a high rate of sock production, a roll of fabric 200 each placed in the upper spool 20 and the lower spool 30 is easy to replace; however the fabric remains secure in the spools during operation of the sewing machine 12.

Figure 4:
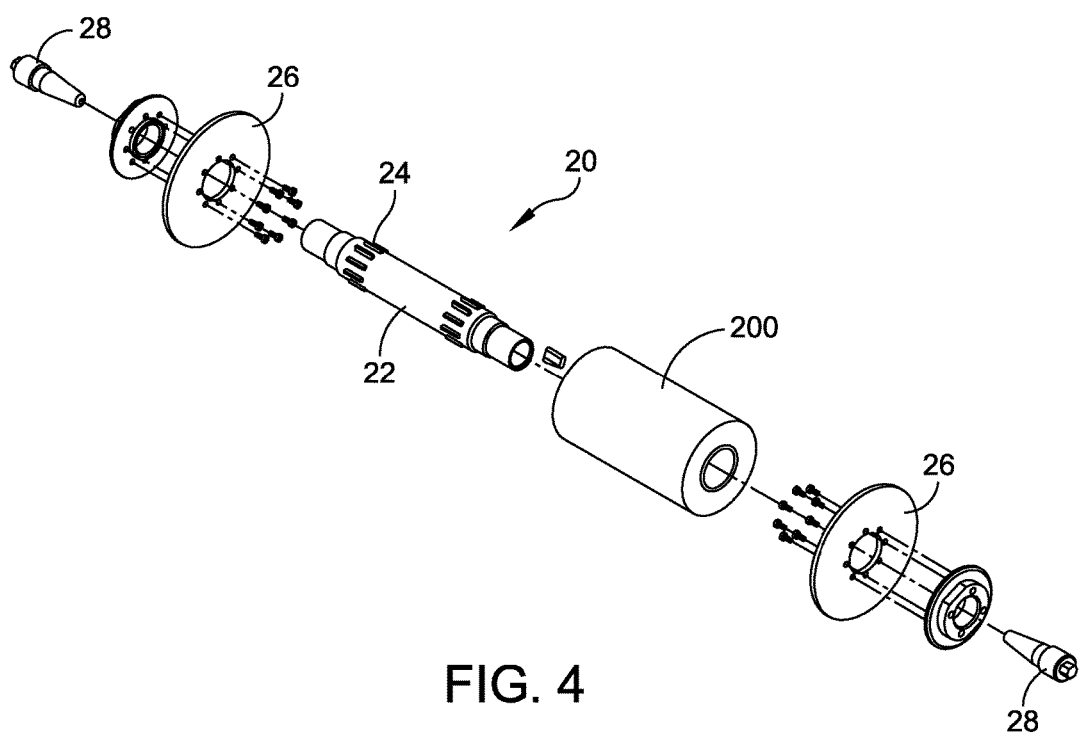
FIG. 4 is a disassembled view of a spool shaft and associated assembly parts.

As shown in FIG. 3, a roll of the fabric 200 is placed onto a spool shaft 22. In the detailed view of FIG. 4, a plurality of wedge-driven spikes 24 orient outward and radially from the spool shaft 22. The spikes 24 are equally spaced around the spool shaft 22 to create an interference fit between the roll of fabric 200 and the spool shaft.

Flanges 26 are positioned on the spool shaft 22 with one face of the flange in proximity but loosely fit at the base of a roll of the fabric 200 on both ends of the spool shaft. A tapered and circular wedge 28 is inserted into the open ends of the spool shaft 40. Rotating the wedge 28 alters the protrusion of the wedge-driven spikes 24.

Returning to FIG. 3, the feeder spool 20 is configured to be easily change out or replace the fabric 200. Each end of the spool shaft 22 is positioned on a clamp base 110. A bearing 112 is attached to the clamp base 110 and a clamp top 114 where the spool shaft 22 contacts the clamp base and the clamp top. The bearing 112 reduces the wear on the spool shaft 22; prevents wear of the clamp base 110; and allows for the smoother rotation of the upper spool 20 with respect to the clamp base.

Figure 5:
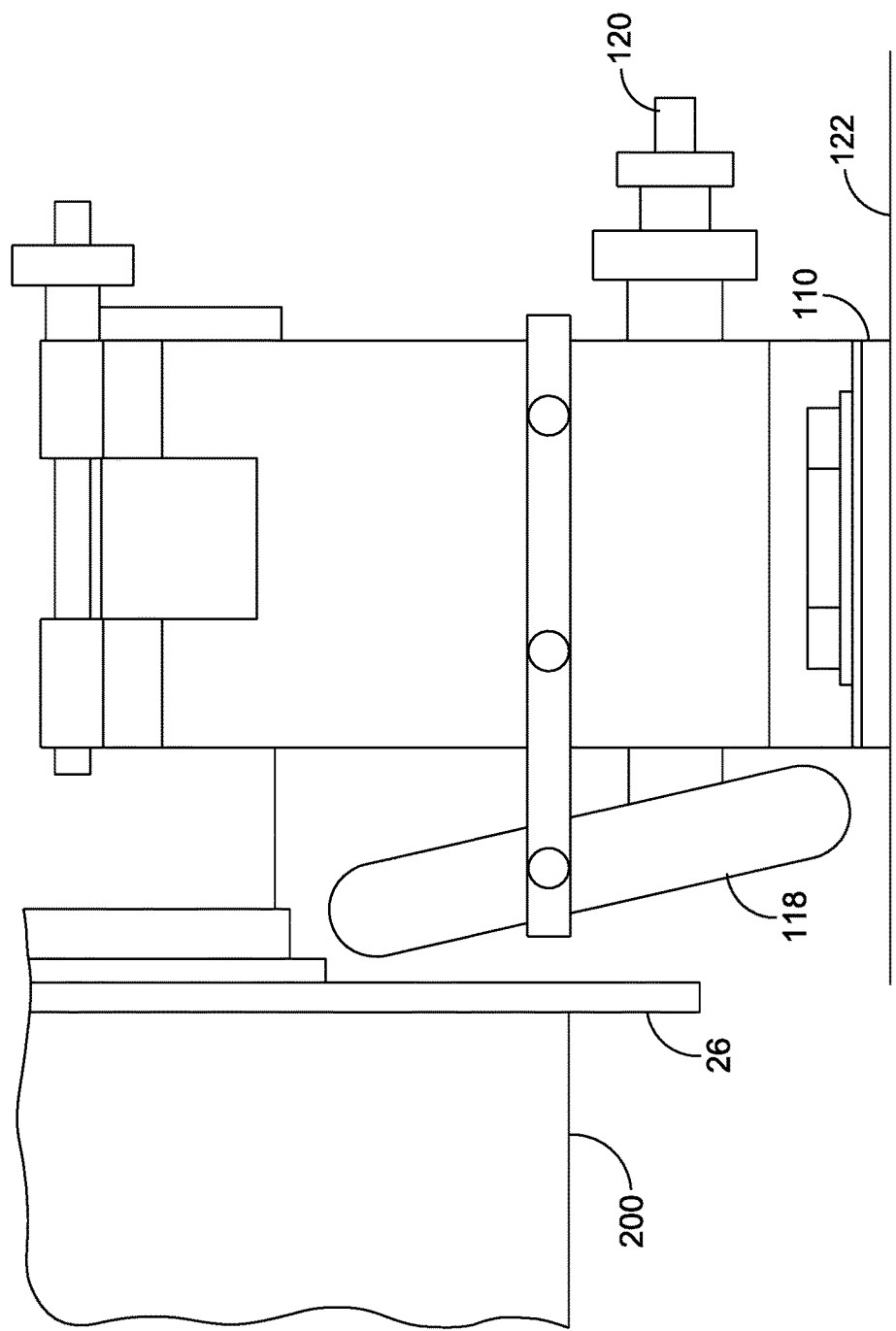
FIG. 5 is a side view of the clamp base, a feeder spool inserted into the clamp base, an alignment tool adjustment knob and an associated alignment tool.

The clamp top 114 is attached to the clamp base 110 by a hinge. When the clamp top 114 is closed, a quick-release pin locks the clamp top to the clamp base 110. A clamp knob 116 is rotated to increase or decrease the tension placed on the upper spool 20 by the clamp top 114 and the clamp base 110 to secure the upper spool. An alignment tool 118 is located between one of the flanges 26 attached to the upper spool 20 and the clamp base 110 (See FIG. 5 for additional details). The position of the alignment tool 118 is adjusted by rotating the alignment tool adjustment knob 120 so that the alignment tool is placed in contact with one of the flanges 26.

When the alignment tool 118 is in contact with the flange 26, the alignment tool puts pressure on the flange to align the feeder spool 20 so that the fabric 200 leaves the feeder spool as flat and straight. The clamp base 110 is attached to a flat base 122 and the flat base is attached to the support structure 66 (See FIG. 1 and FIG. 6).

Figure 6:
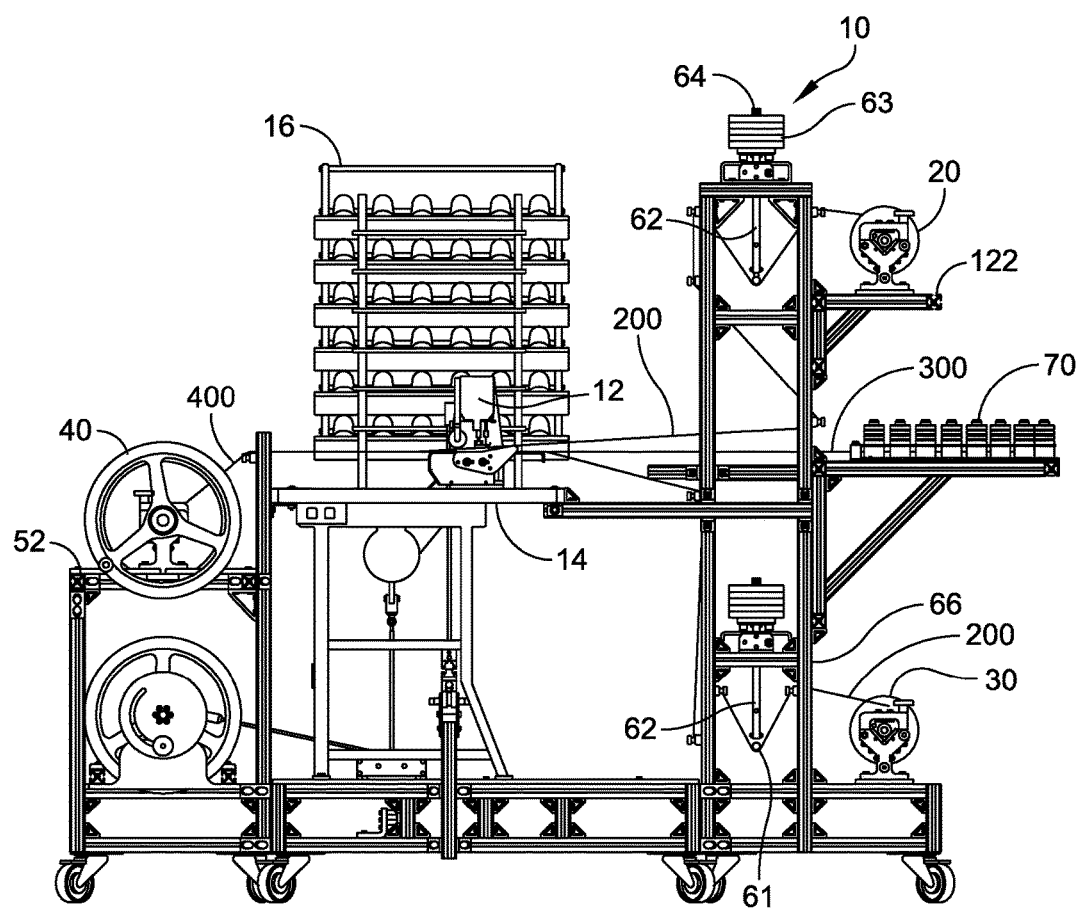
FIG. 6 is a side view of the sewing machine of the present invention with the fabric shaper removed for clarity to show the operational path of the cords and fabric of the strength member.

As shown in FIG. 6, the idlers 60 in proximity to the upper spool 20 and the lower spool 30 maintain tension and dampens sudden jolts in the fabric 200 to make the feed of fabric to the sewing machine 12 more constant with less disruption. Each idler 60 comprises a weighted, vertically sliding, horizontal roller 61 with a vertical bar 62 attached to the horizontal roller, and a plurality of slides mounted to the support structure 66.

The vertical bar 62 constrains the motion of the horizontal roller 61 in a horizontal plane. A plurality of weights 63 are placed on top of the vertical bar 62. The number of the weights 63 can be varied to produce less or more tension in the fabric 200. A pull pin 64 at the top of the vertical bar 62 secures the weights 63 to the idler 60. The horizontal roller 61 contacts the fabric 200 to ensure the fabric remains flat as the fabric is fed into the sewing machine 12. The horizontal roller 61 then applies the tension to the fabric 200.

Figure 7:
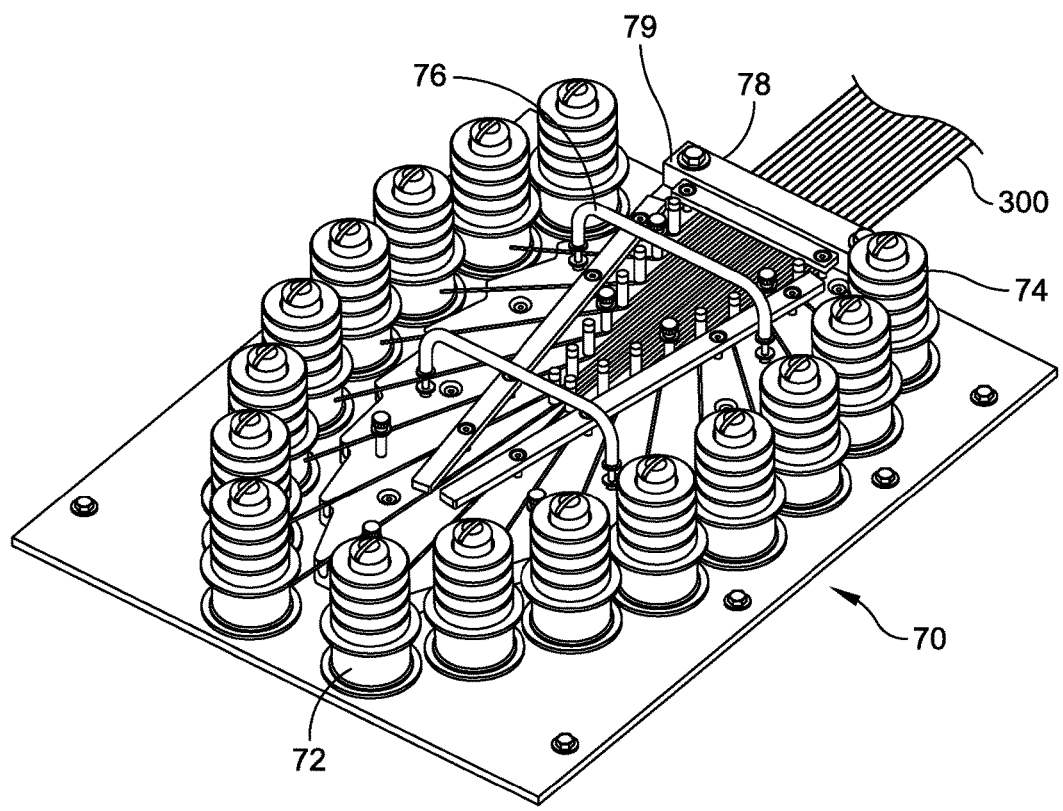
FIG. 7 is an isometric view of the cord supply.

As shown in FIG. 7, the cord supply 70 houses and distributes pull cords 300 in a controlled fashion to prevent the entanglement of the pull cords before the pull cords enter into the sewing machine 12. Each supply spool 72 of the pull cords 300 can be replaced individually. The tension on the pull cords 300 can be varied by applying weights 74 on top of the spools 72.

A cord guide 76 includes handles on a top section to easily remove the section so that replacement pull cords 300 can be loaded with minimal down time and disassembly of the cord guide. Each half of the cord guide 76 has corresponding grooves on one side so that when the halves are combined with the grooves of the bottom half facing the grooves of the top half; a plurality of channels is then formed. The pull cords 300 enter into a cord feeder 78 through the channels.

In use, the pull cords 300 could wear at the cord guide 76 where feeding of the pull cords changes angles. To minimize this wear, a plurality of wear resistant channel reinforcements 79 are inserted into the cord guide 76 at the inside corners of the channels. When the sections of the cord guide 76 are assembled with each other; the pull cords 300 can be seen moving through the cord guide through viewing windows in the cord guide. The cord guide 76 and the cord feeder 78 are attached to a base which attaches to the support structure 66.

Figure 8:
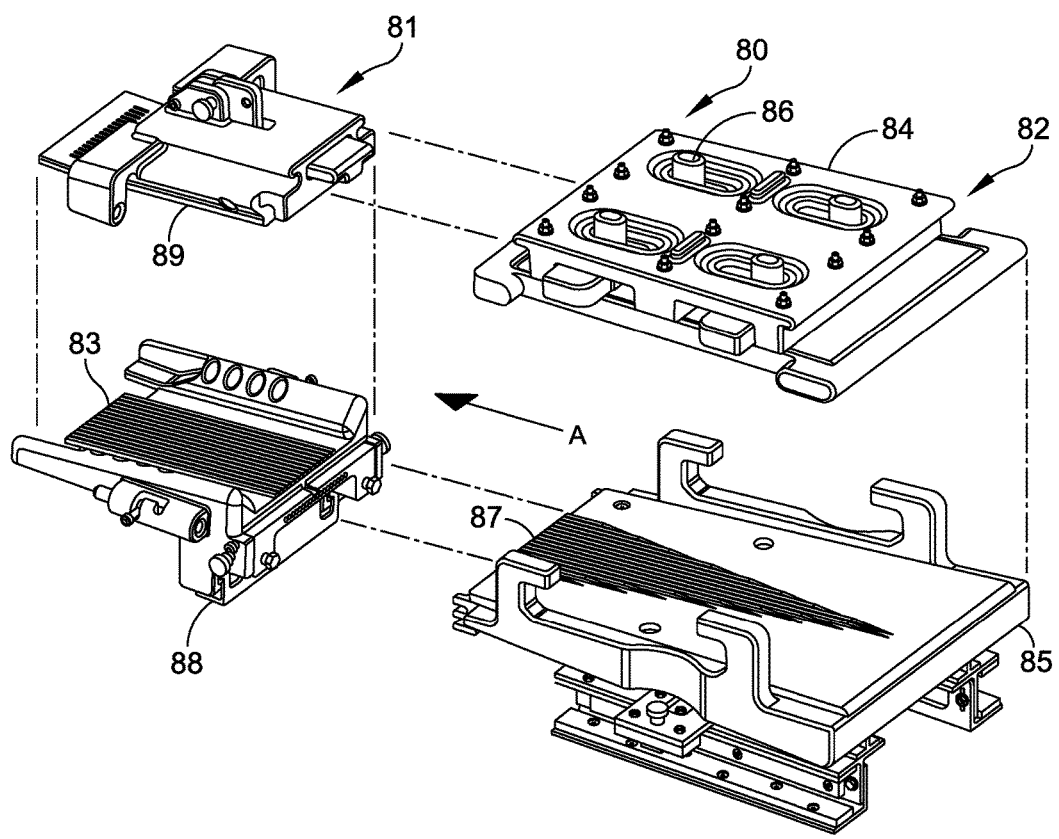
FIG. 8 is a disassembled view of the fabric shaper of the present invention with an upper section lid and a lower section lid separated from an upper section base and a lower section base.

As shown in FIG. 8, the fabric shaper 80 is comprised of a lower section 81 and an upper section 82 with each section having a lid and base. The upper section 82 is furthest from the sewing machine 12 while the lower section 81 contacts a deck 14 of the sewing machine. The upper section 82 shapes the fabric 200 from the upper spool 20 into the crimps that will get stitched into the casings 202. The lower section 81 maintains and supports the newly formed crimps. Grooves 83 on the lower section 81 guide the pull cords 300 from the cord guide 76 to the sewing machine 12. As the fabric 200 from the upper spool 20 enters the upper section 82 and the lower section 81, the weight of an upper section lid 84 shapes the fabric.

The upper section lid 84 can be locked to the upper section base 85 with a plurality of sliding magnetic locks 86. The sliding magnetic locks 86 attract to magnets or metal in the upper section base 85 to lock the upper section lid 84 to the upper section base.

Ridges 87 on the upper section base 85 and a lower section base 88 respectively match cavities in the upper section lid 84 and a lower section lid 89. The ridges 87 are sized smaller than the cavities to create a small thickness gap to allow the fabric 200 to conform to shape and to slide through the fabric shaper 80. A pattern of the upper section lid 84 is a shallow "V" formation of the ridges 87 running linear with feeding direction "A" of the fabric 200 with the tip of the "V" starting in the middle of a width of the fabric. This pattern is needed so that the extra fabric 200 that is required to be crimped to make the casings 202 is slowly taken up by width—starting from the center and working outward as the fabric advances onto the "V" pattern. The upper section lid 84, the lower section lid 89, the upper section base 85, and the lower section base 88 can be easily changed to alter the pattern.

The lower section lid 89 magnetically attaches to the lower section base 88, with magnets in the lower section lid attracting to magnets or metal in the lower section base. If needed, additional magnets can be put into a plurality of magnet slots in the lower section base 88. Also, a sliding lock locks the lower section lid 89 to the lower section base 88.

Figure 9:
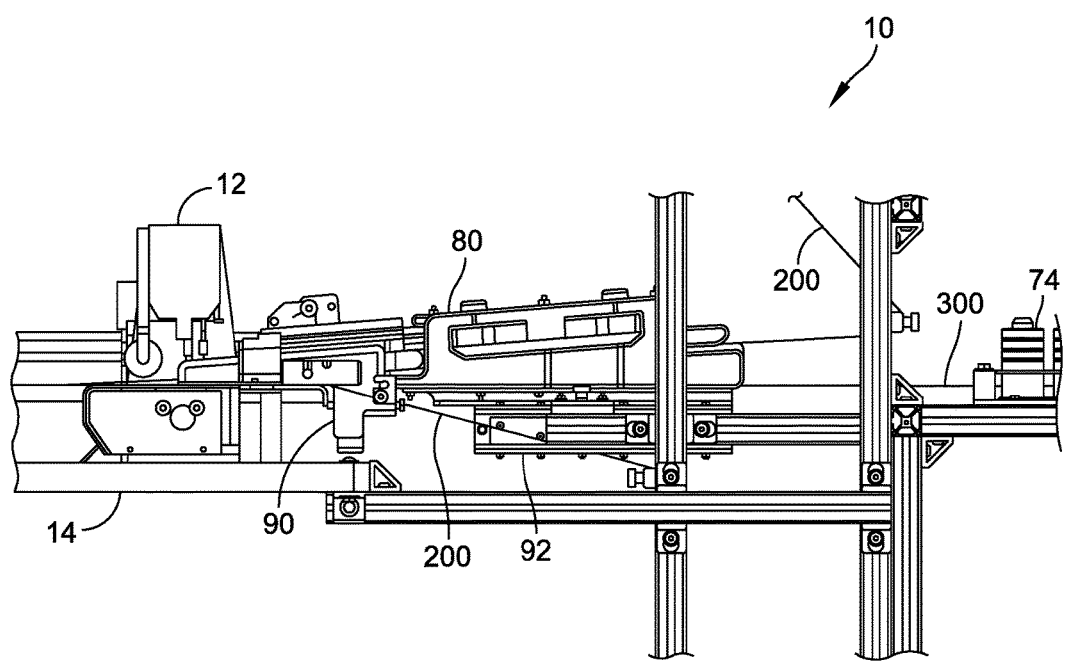
FIG. 9 is a partial side view of the multi-needle sewing machine and fabric shaper of the present invention attached to the support structure.

As shown in FIG. 9, a lower section guide 90 guides the fabric 200 from the lower spool 30, which remains flat and unshaped, into the sewing machine 12. Magnets in the lower section base 88 attract to the metallic deck 14 of the sewing machine 12 to reduce the vibration of the deck and the fabric shaping while the sewing machine is running, which reduces independent movement of the deck and fabric shaping. The guide rail 92 attached to each side of the underside of the upper section base 85 attaches to the support structure 66 and allows the distance between the fabric shaper 80 and the sewing machine 12 to be adjusted.

In this configuration, the fabric shaper 80 is positioned so that the side of the lower section 81 that faces the sewing machine 12 is close to the needles of the sewing machine. The fabric 200 from the upper spool 20 that becomes crimped meets the pull cords 300 and the flat fabric from the lower spool 30 at the end of the fabric shaping. As the crimped fabric 200 leaves the fabric shaping, the pull cords 300 enter the crimps. The flat fabric 200 from the lower spool 30 slides along the deck 14 of the sewing machine 12 and is underneath the crimped fabric and the pull cords 300 before entering the sewing machine.

The sewing machine 12 includes the deck 14 and a thread stand 16 (See FIG. 1 and FIG. 6). The sewing machine 12 performs a chain stitch of the fabric 200 to form the casings 202 by sewing the edges of the crimps in the fabric from the upper spool 20 to the flat fabric from the lower spool 30. The thread stand 16 supplies the thread used by the sewing machine 12 to stitch the casings 202.

Figure 10:
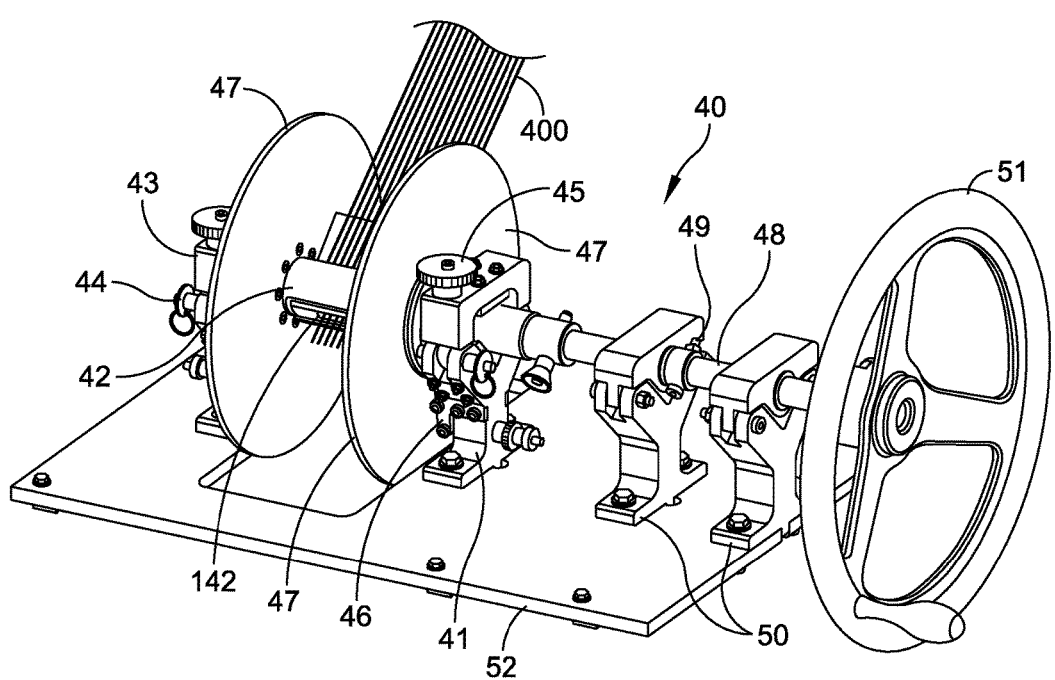
FIG. 10 is an isometric view of the collection spool of the present invention.

As shown in FIG. 10, the collection spool 40 collects a finished product 400 as the finished product leaves the sewing machine 12. A Y-shaped clamp base 41 with a wearable surface on each inside face of the Y-shape supports both ends of a spool shaft 42. A clamp top 43 is attached to the clamp base 41 with a hinge so the clamp top can rotate with respect to the clamp base to open and close. When closed, the clamp top 43 is secured to the clamp base 41 with a quick release pin 44. When the clamp top 43 is closed and secured to the clamp base 41, the bearing on the inside of the clamp top contacts the spool shaft 42. A clamp knob 45 is able to adjust pressure between the clamp top 43 and the spool shaft 42.

An alignment tool 46 is attached to the section of the clamp base 41 that faces a flange 47 attached to either side of the spool shaft 42. A position of the alignment tool 46 can be adjusted so that the alignment tool contacts the flange 47 to adjust the position of the collection spool 40. Adjusting the position of the collection spool 40 allows the collection spool to evenly collect the finished product 400 of fabric.

Figure 11:
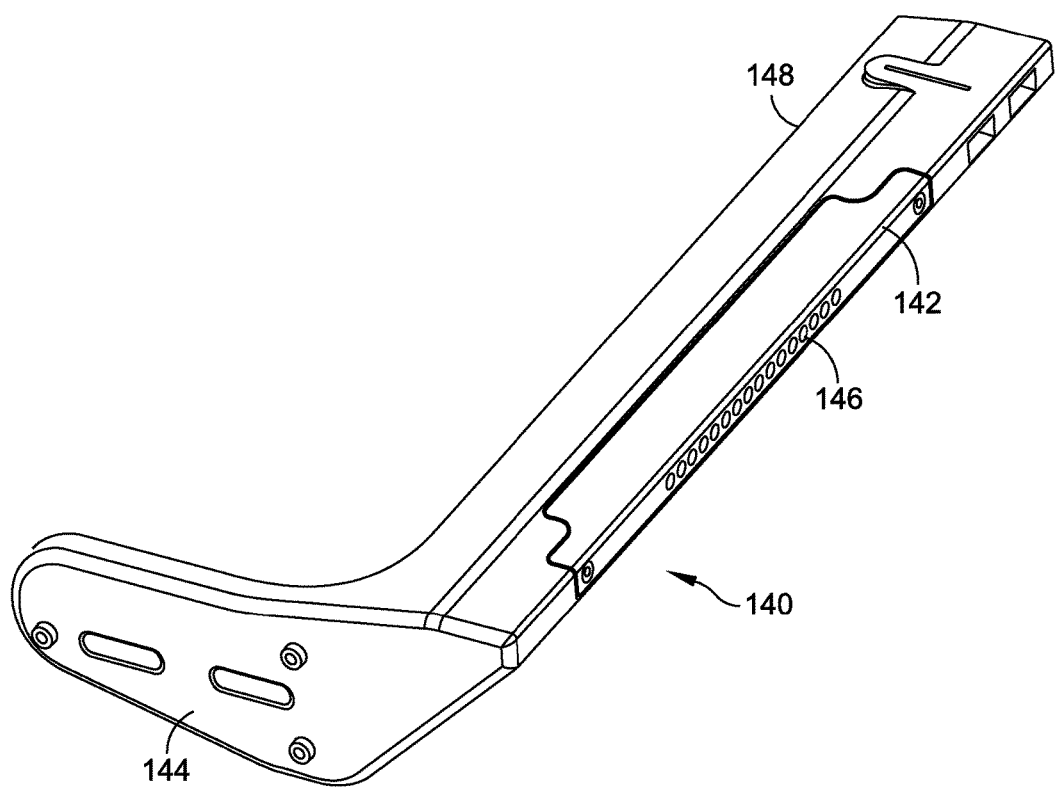
FIG. 11 is an isometric view of the collection spool adapter.

As shown in FIG. 11, the spool shaft 42 has a slot for an adapter 140. The adapter 140 has a fabric clamp 142 on either side of a main body 144 and a plurality of pull cords holes 146. The fabric clamps 142 rotate with respect to the main body 144 to expose the inside of the main body. The end of the pull cords 300 are pulled through pull cords holes 146 and secured with a pull cord clamp 148. The pull cords 300 are placed underneath the pull cord clamp 148. A set screw on either side of the pull cord clamp 148 is rotated to tighten the pull cord clamp to secure the pull cords 300 to the adapter 140.

Before the sewing machine 12 is operated, the fabric 200 from the upper spool 20 and lower spool 30 and the pull cords 300 are pulled through the fabric shaper 80 and the sewing machine, secured in the adapter 140. The adapter 140 is put into a slot in the collection spool 40. The collection spool 40 is attached to one end of a crank shaft 48 with a shaft coupler 49 that allows the collection spool to be quickly detached from the crank shaft. The crank shaft 48 is supported by a plurality of crank shaft supports 50. The other end of the crank shaft 48 is attached to a crank wheel 51. In operation, the user of the sewing machine 10 rotates the crank wheel 51 at a rate similar to the rate that the sewing machine 12 sews the fabric 200. The crank shaft supports 50 are attached at a flat base 52, which attaches to the support structure 66.

Figure 12:
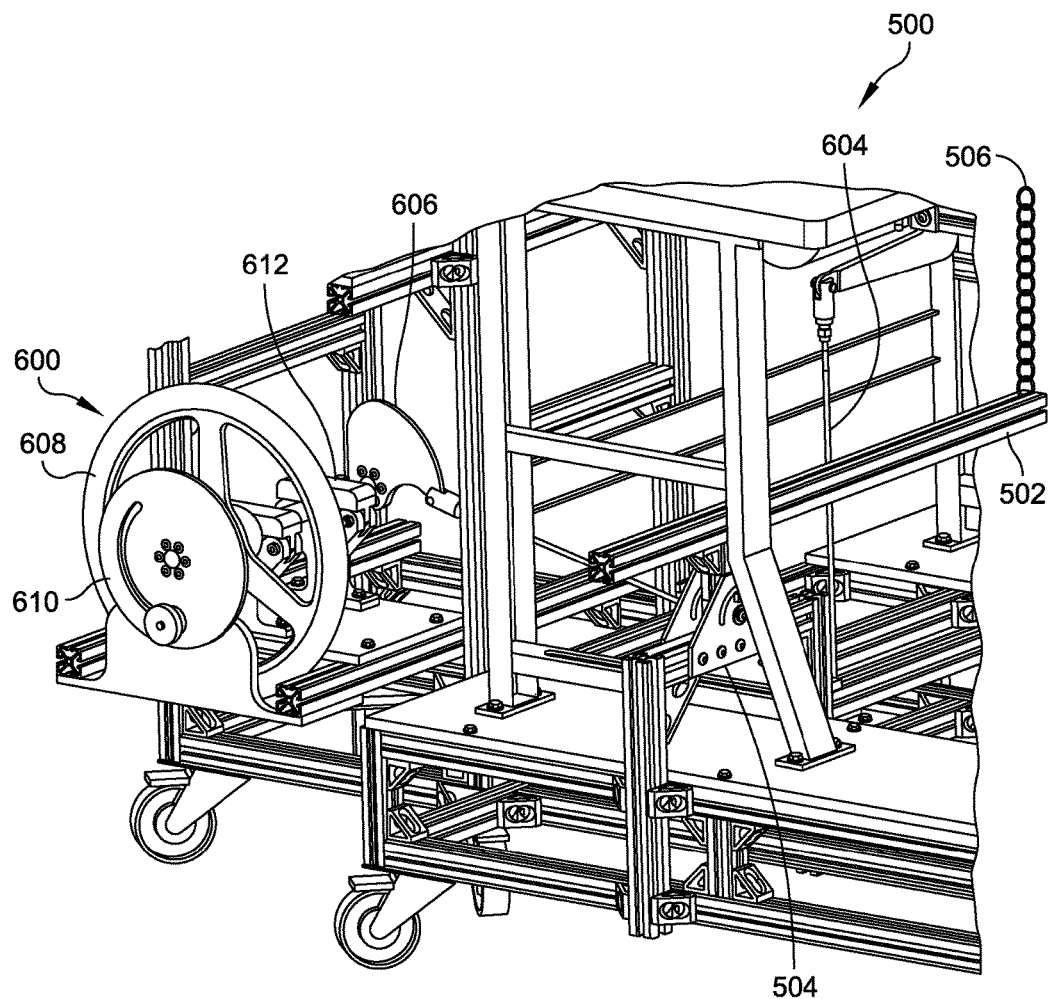
FIG. 12 is an isometric view of the speed control and pressure tool of the sewing machine.

FIG. 12 depicts a pressure foot lift 500 comprised of a lever 502, a fulcrum 504, and a chain 506. The pressure foot lift 500 moves the location from which the multi-needle sewing machine 12 is actuated because of the location of the collection spool 40 and the support structure 66. The pressure foot lift 500 moves the actuation motion to the side of the sewing machine 10 and close to the other controls. The fulcrum 504 is attached to the support structure 66 and to the lever 502 between the two ends of the lever. One end of the lever 502 faces the user and is used by the user to set the position of the pressure foot lift 500. Raising or lowering the lever 502 changes the position of the foot pressure foot lift 500. A set screw is used to lock the position of the lever 502 and the pressure foot lift 500, into a desired position so the user does not need to hold the lever in position while using the sewing machine 12.

A speed control 600 is used to regulate and maintain the speed of the sewing machine 12. Use of variable speed multi-needle sewing machine 12 normally operates at top speed so a clutch 602 is used to slow down the sewing machine. The clutch 602 actuates to slow down a motor of the sewing machine 12. The support structure 66 and the location of the collection spool 40 requires the user to operate the clutch 602 from the side of the sewing machine 12.

The speed control 600 moves the location from which the user operates the clutch 602 to the side of the sewing machine 12. A cable 604 is attached to the clutch 602 and is routed through a plurality of pulleys attached to the support structure 66 to a cam operator 606. The cam operator 606 is attached by a shaft to a hard wheel 608 and slotted wheel 610. A plurality of shaft supports 612 support the shaft and allow the shaft to rotate. The shaft supports 612 are attached to a flat base and the support structure 66.

The hard wheel 608 is rotated by the user to change the position of the clutch 602 and thus the speed of the sewing machine 12. The slotted wheel 610 rotates with the shaft as the user rotates the hard wheel 608. The slot in the slotted wheel 610 allows the slotted wheel to rotate around a knob 614. The knob 614 is attached to a flange 616, which is attached to the support structure 66. The knob 614 can be rotated to lock the position of the slotted wheel 610 to set the desired speed of the sewing machine 12 without the user having to hold the hard wheel 608 in position while operating the sewing machine.

It will be understood that many additional changes in the details, materials, steps and arrangement of parts, which have been herein described and illustrated in order to explain the nature of the invention, may be made by those skilled in the art within the principle and scope of the invention as expressed in the appended claims.

The foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention as defined by the accompanying claims.

What is claimed is:

1. An assembly for stitching longitudinal casings on fabric, said assembly comprising:
    a support structure;
    a sewing machine positioned on a first flat surface of said support structure, said sewing machine capable of stitching the longitudinal casings;
    a lower feeder spool positioned on a first corner and a second flat surface of said support structure, said lower feeder spool operationally connected to feed fabric to said sewing machine;
    an upper feeder spool positioned on a second corner above the first corner and positioned on a third flat surface of said support structure, said upper feeder spool operationally connected to feed fabric to said sewing machine;
    a cord supply positioned vertically between said upper feeder spool and said lower feeder spool on a fourth flat surface of said support structure, said cord supply capable of supplying cord between the fabric fed by said upper spool and the fabric fed by said lower spool;
    a fabric shaper operationally connected to and fed fabric by said upper feeder spool and fed fabric by said lower feeder spool and fed cord from said cord supply with said fabric shaper positioned on said support structure adjacent to said sewing machine and said fabric shaper having a first upper section with at least one cavity larger than at least one corresponding raised ridge in a second upper section such that fabric fed by said upper spool is crimped as the fabric passes through said first upper section and said second upper section and wherein said fabric shaper further comprises a first lower section with at least one cavity larger than at least one corresponding raised ridge in a second lower section, said first lower section magnetically and mechanically connected to said second lower section with said first lower section and said second lower section mechanically connected to said first upper section and said second upper section such that the cavity of said first lower section aligns with the cavity of said first upper section and the raised ridge of said lower section aligns with the raised ridge of said second upper section to maintain the crimp in the fabric leaving said first upper section and said second upper section; and
    a collection spool operationally connected to said sewing machine to collect a finished product of fabric with stitched longitudinal casings from said sewing machine, said collection spool positioned adjacent to said sewing machine at the side of said sewing machine that the finished product leaves said sewing machine and at the side of said support structure opposite to the side of said support structure that supports said upper feeder spool, said fabric shaper and said lower feeder spool;
    wherein a width of said upper feeder spool is sized for fabric wider than fabric supplied by said lower feeder spool such that at least one longitudinal casing can be formed in the fabric fed by said upper feeder spool to said fabric shaper.

2. The assembly in accordance with claim 1, wherein said upper feeder spool further comprises a shaft along a longitudinal axis of said upper feeder spool, said shaft having a set of recessed wedge-shaped spikes that are able to protrude radially around a section of said shaft to be securingly contactable with the fabric on said upper feeder spool; and
    wherein said lower feeder spool further comprises a shaft along a longitudinal axis of said upper feeder spool, said shaft having a set of recessed wedge-shaped spikes that are able to protrude radially around a section of said shaft to be securingly contactable with the fabric of the lower feeder spool.

3. The assembly in accordance with claim 2, said assembly further comprising a plurality of tapered and circular wedges with a first wedge insertable in a first end of said section of said lower feeder spool, a second wedge insertable in a second end of said section of said lower feeder spool, a third wedge insertable in a first end of said section of said upper feeder spool and a fourth wedge insertable in a second end of said section of said upper feeder spool wherein said spikes of said sections of said lower feeder spool and said upper feeder spool are controllable to an extent of protrusion from said shaft by an insertion and removal of each of said plurality of wedges at a depth from said sections of said lower feeder spool and said upper feeder spool as said spikes follow a taper of said wedges.

4. The assembly in accordance with claim 3, said assembly further comprising a first clamping mechanism, said first clamping mechanism having a plate on said third flat surface with a vertical, Y-shaped clamp base attached thereon and a clamp top hinged to said clamp base such that when closed, said clamp top secures said shaft of said upper feeder spool; and
    said first clamping mechanism having a quick release mechanically connected to said clamp top such that said upper spool is capable of being readily removable and insertable for use by an action of said quick release.

5. The assembly in accordance with claim 4, said assembly further comprising a second clamping mechanism, said second clamping mechanism having a plate on said second flat surface with a vertical, Y-shaped clamp base attached thereon and clamp top hinged to said clamp base such that when closed, said clamp top secures said shaft of said lower feeder spool; and said second clamping mechanism having a quick release mechanically connected to said clamp top such that said lower spool is capable of being readily removable and insertable for use by an action of said quick release.

6. The assembly in accordance with claim 5, wherein said clamp base of said first clamping mechanism further comprises an adjustable alignment mechanism mechanically connected to said clamp base such that a position of said upper feeder spool in said clamping assembly is capable of being adjusted; and wherein said clamp base of said second clamping mechanism further comprises an adjustable alignment mechanism mechanically connected to said clamp base such that a position of said lower feeder spool in said clamping assembly is capable of being adjusted.

7. The assembly in accordance with claim 6, wherein said cord supply comprises a plurality of channels in a base plate with each of said channels having a first end and a second end;

a plurality of spools of pull cords with weights arranged in a U-shape configuration and attached on the base plate to feed pull cords to said channels at the first end of said channels with said weights maintaining tension in the pull cords leaving said spools; and a cord guide that is capable of arranging the pull cords in an orderly fashion to said fabric shaper from the second end of said channels.

8. The assembly in accordance with claim 7, wherein an underside of said second upper section and said lower section of said fabric shaper have a plurality of grooves to guide pull cords fed by said cord supply such that the pull cords do not become entangled as the pull cords travel to said sewing machine.

9. The assembly in accordance with claim 8, wherein at least one guide rail is mechanically attached to said second upper section and is contactable with said support structure such that the position of said fabric shaper relative to said sewing machine can be changed.

10. The assembly in accordance with claim 9, wherein said sewing machine further comprises a thread stand in proximity to the sewing machine to supply thread to stitch the casings, to sew the fabric supplied by said upper spool to the fabric supplied by said lower spool at the troughs of the crimp in the fabric supplied by the upper spool in a longitudinal manner to produce at least one longitudinal casing.

11. The assembly in accordance with claim 10, wherein said collection spool comprises a slotted shaft with an adapter inserted into the slot of said slotted shaft wherein said adapter comprises a clamping mechanism for the fabric supplied by said upper feeder spool, a clamping mechanism for fabric supplied by the lower feeder spool, and a clamping mechanism for pull cords supplied by the cord supply to secure the fabric and pull cords as the fabric and pull cords are pulled through the fabric shaper and sewing machine, a crank shaft mechanically connected with a quick release to said slotted shaft such that said slotted shaft is rotated by rotation of said crank shaft, and a crank wheel mechanically mated to said crank shaft for a user to rotate said crank shaft at a speed equal to production of the finished product.

12. The assembly in accordance with claim 11, wherein said support structure further comprises a clamping mechanism for said collection spool and a quick release mechanically connected to said clamping assembly such that said collection spool is capable of being removed and inserted into the assembly.

13. The assembly in accordance with claim 12, wherein said clamping mechanism further comprises a plate with a vertical, Y-shaped clamp base mechanically mated to the plate at each end of the slotted spool shaft, a rectangular clamp top hinged to said clamp base such that when closed said clamp top secures said slotted shaft and locks with a quick release and at least one vertical, Y-shaped clamp based mechanically mated to said plate, and a rectangular clamp top mechanically attached to said clamp base to secure said crank shaft.

14. The assembly in accordance with claim 13, wherein the surfaces of said clamp base and said clamp top contactable with said slotted spool shaft are bearing surfaces and said clamp top supporting said crank shaft having a bearing contactable with said crank shaft and internal to said clamp top.

15. The assembly in accordance with claim 14, wherein said clamp base supporting said collection spool further comprises an adjustable alignment mechanism mechanically connected to said clamp base such that the position of said collection spool in said clamping assembly is capable of being adjusted.

16. A method for fabricating longitudinal casings interstitched on a fabric, said method comprising the steps of:
providing a first supply of fabric in a longitudinal manner;
providing a second supply of fabric in a longitudinal manner;
crimping the first supply of fabric in a longitudinal manner for at least one longitudinal casing;
mating the second supply of fabric to the first supply of fabric such that the troughs of at least one casing faces the second supply of fabric;
pulling at least one pull cord through the interior of at least one casing;
stitching a first longitudinal edge of at least one casing and a second longitudinal edge of at least one casing subsequent to said pulling step; and
collecting a sock of interstitched longitudinal casings on a fabric;
wherein the sock is collected by winding the sock around a collection spool.

17. The method in accordance with claim 16, said method further comprising the step of controlling speed of said stitching step.

18. The method in accordance with claim 17, wherein said speed controlling step is performed by a speed control.

* * * * *